[19] United States Patent
Dubost

[11] Patent Number: 5,161,861
[45] Date of Patent: * Nov. 10, 1992

[54] ORNAMENTAL WHEEL HUB CAP

[75] Inventor: Dominique Dubost, La Celle Saint Cloud, France

[73] Assignee: Rapid S.A., Paris, France

[*] Notice: The portion of the term of this patent subsequent to Feb. 26, 2008 has been disclaimed.

[21] Appl. No.: 549,608

[22] Filed: Jul. 9, 1990

[30] Foreign Application Priority Data

Jul. 20, 1989 [FR] France ................................ 89 09795

[51] Int. Cl.$^5$ .............................................. B60B 7/06
[52] U.S. Cl. ................................ 301/37.42; 301/37.34
[58] Field of Search ............... 301/37 R, 37 P, 37 TP, 301/37 PB, 108 R, 108 A

[56] References Cited

U.S. PATENT DOCUMENTS 4,740,038 4/1988 Okano et al. ................. 301/37 R X
4,929,031 5/1990 Shenq-Gwo ...................... 301/37 P
4,995,673 2/1991 DuBost ............................. 301/37 P

FOREIGN PATENT DOCUMENTS 0271038 6/1988 European Pat. Off. ......... 301/37 PB
0090802 4/1989 Japan ............................... 301/37 PB Primary Examiner—Russell D. Stormer
Attorney, Agent, or Firm—Ostrolenk, Faber, Gerb & Soffen

[57] ABSTRACT

An ornamental wheel hub cap adapted to be secured onto the wheel rim of a vehicle through the medium of a resiliently deformable ring split to form two free ends connected together by a spring-like wire allowing the radial deformation of the ring whereas a strap is made into one piece of material or moulded at its two ends integrally with the free ends of the ring so as to exert upon the latter a prestress against the force exerted by the wire spring.

11 Claims, 1 Drawing Sheet

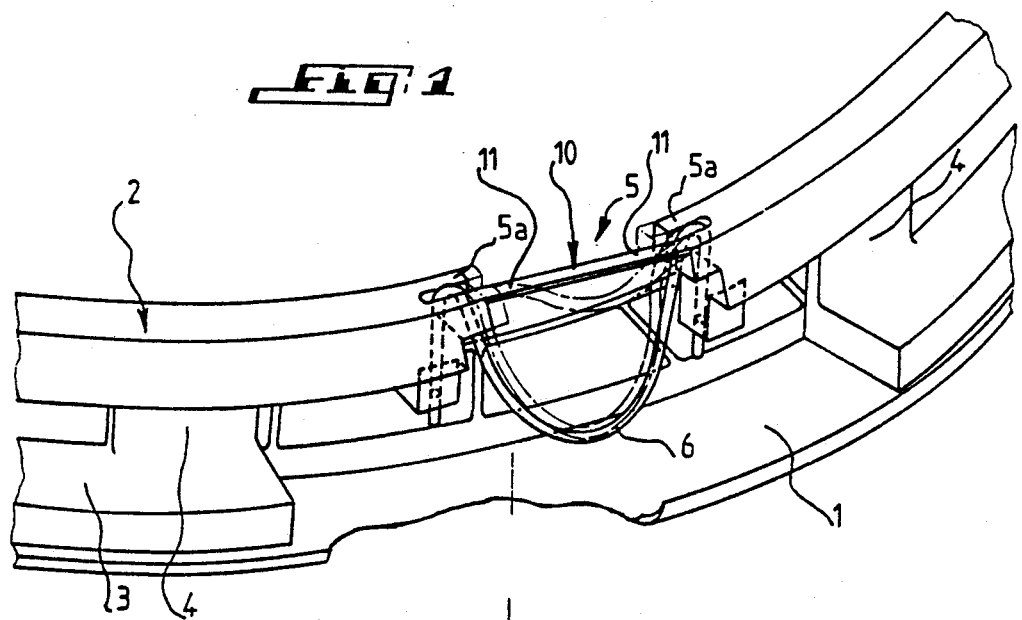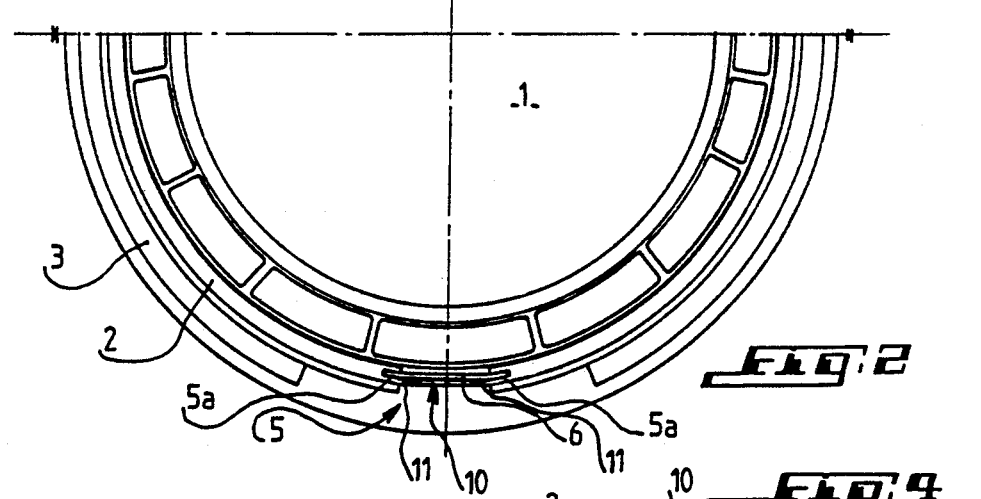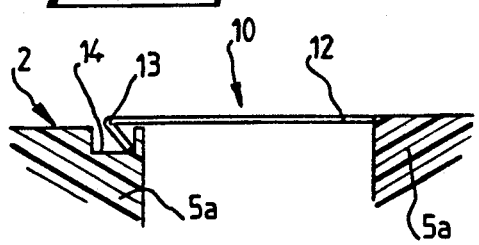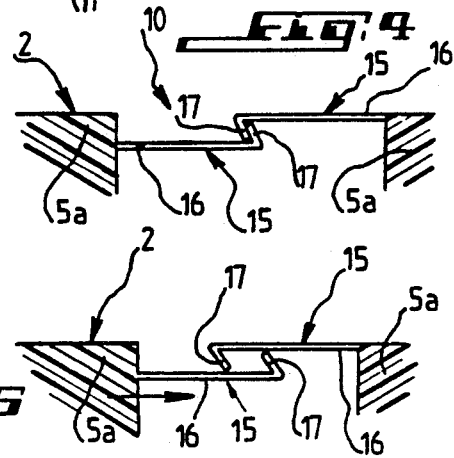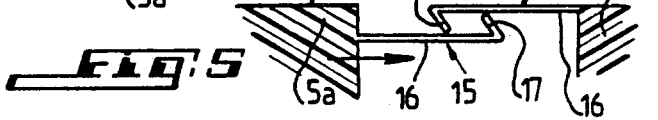

ORNAMENTAL WHEEL HUB CAP

BACKGROUND OF THE INVENTION

The present invention relates essentially to an improved ornamental wheel hub cap.

There is already known from the U.S. Pat. No. 4,995,673 and commonly owned by applicant's assignee an ornamental wheel hub cap adapted to be removably secured within a stepped portion of the rim or felloe of a wheel of a vehicle through the agency of a resiliently deformable ring clipped into the stepped portion and discontinued or split to form at least two free ends connected together by at least one resilient deformable means such as, for instance, a wire allowing the radial deformation of said ring.

Moreover, a removable strap could be mounted between both free ends of the ring for exerting a prestress upon the latter against the force exerted by the resiliently deformable means so as to avoid the deformation of the cap-ring assembly before mounting onto the wheel rim and also to allow the mounting of this assembly through clipping onto the rim after removal of the strap.

It is therefore understood that after the ornamental wheel hub cap has been mounted onto the wheel rim or felloe, the strap becomes useless and constitutes a lost or, wasted element. Moreover the strap requires an individual manufacturing step separate from the other elements of the ornamental wheel hub cap. Finally, the mounting of the ornamental wheel hub cap onto the wheel rim requires a special intervention upon the strap to extract it from the ring of the ornamental wheel hub cap prior to carrying out the mounting.

SUMMARY OF THE INVENTION

Thus, the object of the present invention is to cope with this inconvenience by providing an ornamental wheel hub cap avoiding or dispensing with any intervention upon the strap and which henceforth is no longer an expensive and losable element.

For this purpose the invention is directed to an ornamental wheel hub cap adapted to be removably secured within a stepped portion of the wheel rim of a vehicle through the medium of a resiliently deformable ring clipped into said stepped portion and discontinued or split to form at least two free ends connected together by at least one resiliently deformable means such as, for instance, a wire allowing the radial deformation of the rim whereas a strap is provided between both aforesaid free ends to exert by the resiliently deformable means thereby to avoid the deformation of the cap-ring assembly before being mounted upon the wheel rim, the strap being made integral in one piece of material or molded by at least one of its two ends with the ring.

It is thus understood that the strap is an integral part of the ring and therefore removes all the drawbacks referred to hereinabove.

According to an exemplary embodiment, the strap is flexible and its two ends are made integral in one piece of material or molded with both free ends, respectively, of the ring.

According to another embodiment the strap is substantially rigid and molded in one piece at one of its two ends with one free end of the ring and comprises at its other end an means for hooking it on to the other free end of the ring.

According to still another embodiment, the aforesaid strap comprises two substantially rigid strap portions each comprising a first end molded integral with on the free end of the ring and a second end provided with means for fastening both strap portions.

According to still a further aspect of the invention, the aforesaid fastening means comprise hook-shaped elements.

BRIEF DESCRIPTION OF THE DRAWINGS

The invention will be better understood and further objects, characterizing features, details and advantages thereof will appear more clearly as the following explanatory description proceeds with reference to the accompanying drawings given by way of non-limiting example only and illustrating a presently preferred specific embodiment of the invention wherein:

FIG. 1 is a partial perspective view of an ornamental wheel hub cap according to this invention;

FIG. 2 is a half top and bottom view of this ornamental cap;

FIG. 3 is a diagrammatic side view of another embodiment of the strap integral with the ring; and FIGS. 4 and 5 are diagrammatic side views of still another embodiment of the strap integral with the ring in the hooked position and in the unhooked position, respectively.

DETAILED DESCRIPTION

Referring to FIGS. 1 and 2, there is seen an ornamental wheel hub cap which comprises of an outer ornamental web 1 to which is secured a ring or crown 2 allowing the web 1 to be secured through clipping into the stepped portion (not shown) of a wheel rim (also not shown).

The crown or ring 2 may be secured to the web 1 in any suitable way.

The ring 2 may be made integral with the web 1 and obtained through molding therewith or it may consist of an independent element which is secured through adhesive bonding or riveting onto the web 1 or which is removably secured to this web through the agency of suitable clamps or like fasteners whatsoever, for instance.

The ring 2 preferably comprises a base portion 3 secured to the web 1 and connected to the ring through lugs or the like 4 adapted to give the ring a radial elasticity.

As shown in FIGS. 1 and 2, the ring 2 comprises one discontinued portion such as 5 but it could without leaving the scope of the invention be discontinued, at two or more locations positioned substantially along its perimeter although this has not been shown.

Both free ends 5a of the ring 2 which define the gap 5 are connected by a spring-like wire 6 hooked onto said free ends by any suitable means such as, for instance, through a simple opening.

According to the invention, the mutually opposed ends 5a are connected by a strap 10 which is made integral in one piece of material or molded by at least one of the two ends with the ring 2, it being understood that in the rest position of the ornamental wheel hub cap the strap 10 will be tensioned or stretched so as to exert a prestress upon the ring 2 against the force exerted by the spring-like wire 6 urging the free ends 5a of the ring to move away from each other.

According to the exemplary embodiment illustrated by FIGS. 1 and 2, the strap 10 is flexible and its two ends 11 are made by being molded together integrally with both ends 5a, respectively, of the ring 2.

According to the second exemplary embodiment shown in FIG. 3, the strap 10 is substantially rigid and molded integrally at one end 12 together with a free end 5a of the ring 2 whereas the other end 13 of the strap exhibits a hook-like shape or the like adapted to be hooked into an opening 14 formed in the other free end 5a of the ring 2.

According to the embodiment shown in FIGS. 4 and 5, the strap 10 comprising two strap portions 15. Each strap portion 15 comprises one end 16 moulded in one piece integral with one free end 5a of the ring 2. The other end 17 of each strap portion 15 exhibits a hook-like shape so as to provide for the hooking together of both strap portion 15 when the ornamental wheel hub cap is at rest, i.e. in a stand-by condition prior to its being mounted.

For a better understanding, the manner of using the ornamental wheel hub cap will be described briefly hereinafter.

First, as to the embodiment shown in FIGS. 1 and 2, it should be recalled that in the rest position or stand-by condition prior to its mounting, the flexible strap 10 will be tensioned or stretched so as to exert a prestress upon the ring 2 against the force exerted by the wire spring 6.

For mounting the ornamental wheel hub cap onto the wheel rim, it will suffices to merely compress or squeeze the ring 2 into the annular stepped portion of this rim thereby providing some compression to the wire spring 6 and some release to the flexible strap 10 as shown in the dotted lines of FIG. 1. This means that in the clipped position of the ornamental wheel hub cap onto the rim, the wire spring 6 and the flexible strap 10 integral with the ring 2 will have substantially the position shown in the dotted lines of FIG. 1.

If reference is now made to the embodiment of FIG. 3, the operation stated hereinabove is the same except that the substantially rigid strap 10 will be hooked with its end 13 onto one of the two free ends 5a of the ring 2 when the ornamental wheel hub cap is in its stand-by condition before being mounted. The clipping of the ornamental cap into the stepped portion of the wheel rim will automatically release the hook-shaped end 13 from the opening 14 owing to the free ends 5a of the ring 2 moving slightly towards each other.

Finally, as to the alternative embodiment shown in FIG. 4, the operation is still the same as previously described except that the clipping of the ornamental cap into the stepped portion of the wheel rim will merely cause the hooks 17 of both strap portions 15 to move away from each other as seen in FIG. 5 while these two hooks were engaging each other in the interlocking relationship as seen in FIG. 4 when the ornamental cap was in the stand-by position before being mounted.

It should be understood that the invention is not at all limited to the embodiments described and illustrated which have been given by way of example only.

Thus the discontinuities in the ring and therefore the straps 10 integral with the ring may be in any number whatsoever. Furthermore, the means for hooking one of the ends of the strap onto the rings when this strap only comprises only single end molded in one piece integral with the ring may be varied within the scope of the invention. As discussed, two strap portions hooking each other can also be sued, or any other means within the scope of the invention.

Therefore the invention comprises all the technical equivalents of the means described as well as their combinations if the latter are carried out according to its gist and within the scope of the appended claims.

What is claimed is:

1. An ornamental wheel hub cap adapted to be removably secured into a stepped portion of a wheel rim of a vehicle through the medium of a resiliently deformable ring clipped into said stepped portion and split to form at least two free ends connected together by at least one resiliently deformable means allowing said ring to be radially deformed, a strap being provided between both free ends to exert a prestress upon the ring against a force exerted by the resiliently deformable means thereby preventing deformation of the ring before mounting onto the wheel rim wherein the improvement comprises that said strap is made integral at least at one of tis two ends with said ring.

2. An ornamental wheel hub cap according to claim 1, wherein said strap is flexible and both ends thereof are made integral in one piece of material with said ring.

3. An ornamental wheel hub cap according to claim 1, wherein said strap is substantially rigid and made integrally at one of its two ends with one free end of the ring and further comprising means at the other end of the strap for fastening to the other free end of the ring.

4. An ornamental wheel hub cap according to claim 1, wherein said strap comprises two substantially rigid strap portions each comprising a first end molded in one piece integrally with a respective free end of the ring and a second end provided with hooking means for attaching to the other strap portion.

5. An ornamental wheel hub cap according to claim 4, wherein said hooking means each comprise hook-shaped elements for releasably securing to each other.

6. An ornamental wheel hub cap according to claim 1, wherein said resiliently deformable means comprises a wire.

7. An ornamental wheel hub cap according to claim 1, wherein said strap is made integral with the ring at both ends of the strap.

8. An ornamental wheel hub cap according to claim 1, wherein said strap is molded at least at one of its ends to the ring.

9. An ornamental wheel hub cap according to claim 3, wherein said means for fastening comprises means for releasably fastening the other end of the strap to the other free end of the ring.

10. An ornamental wheel hub cap according to claim 9, wherein said fastening means comprises a hook-shaped element for releasably attaching to the other free end of the ring.

11. An ornamental wheel hub cap according to claim 2, wherein said strap is molded at both of its ends to the ring.

* * * * *